(12) United States Patent
Grace

(10) Patent No.: US 7,293,659 B2
(45) Date of Patent: Nov. 13, 2007

(54) DRUM STRUCTURE FOR ROTARY DRUM FILTERING APPARATUS AND METHODS OF USING SAME

(75) Inventor: Todd S. Grace, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 11/443,272

(22) Filed: May 31, 2006

(65) Prior Publication Data

US 2007/0012613 A1    Jan. 18, 2007

Related U.S. Application Data

(60) Provisional application No. 60/699,392, filed on Jul. 15, 2005.

(51) Int. Cl.
*B01D 33/067* (2006.01)
*B01D 33/073* (2006.01)

(52) U.S. Cl. .................. 210/404; 210/402; 210/784

(58) Field of Classification Search ............... 210/402, 210/404, 784, 406
See application file for complete search history.

(56) References Cited

U.S. PATENT DOCUMENTS

| | | | | |
|---|---|---|---|---|
| 3,150,083 A | * | 9/1964 | Luthi | 210/404 |
| 3,225,935 A | * | 12/1965 | Porteous | 210/404 |
| 3,306,460 A | * | 2/1967 | Luthi | 210/404 |
| 3,363,774 A | * | 1/1968 | Luthi | 210/404 |
| 3,386,584 A | * | 6/1968 | Luthi | 210/404 |
| 3,403,786 A | * | 10/1968 | Luthi | 210/217 |
| 3,504,802 A | * | 4/1970 | Luthi | 210/404 |
| 3,517,818 A | * | 6/1970 | Luthi | 210/392 |
| 3,680,708 A | * | 8/1972 | Luthi | 210/404 |
| 3,794,178 A | * | 2/1974 | Luthi | 210/404 |
| 3,837,499 A | | 9/1974 | Luthi | |
| 5,308,488 A | | 5/1994 | Nelson | |

* cited by examiner

*Primary Examiner*—Thomas M. Lithgow
(74) *Attorney, Agent, or Firm*—Nixon & Vanderhye PC

(57) ABSTRACT

A drum structure for corrugated type rotary filters has relatively high filtering efficiency and relatively low manufacturing and/or installation costs. More specifically, a corrugated deck section is rigidly connected to a rotary drum structure by means of solid non-apertured divider grids which establish a drain channel. The drain channel is subdivided into respective compartments by means of intermediate solid non-apertured grids which are unconnected to the corrugated deck, but provide subjacent radial support thereto. Drainage slits are provided in the corrugated deck in alignment with each of the compartments. Plug dams are provided in the corrugation spaces between the upper edge of the intermediate grids and the lower corrugated deck surface so as to prevent substantially filtrate flow between individual compartments. Filtrate may thus flow through the drainage slits and into a respective one of the compartments where it can then subsequently be drained transversely and longitudinally into a respective port associated with the drum filter.

19 Claims, 1 Drawing Sheet

DRUM STRUCTURE FOR ROTARY DRUM FILTERING APPARATUS AND METHODS OF USING SAME

CROSS-REFERENCE TO RELATED APPLICATION

Figure 1:
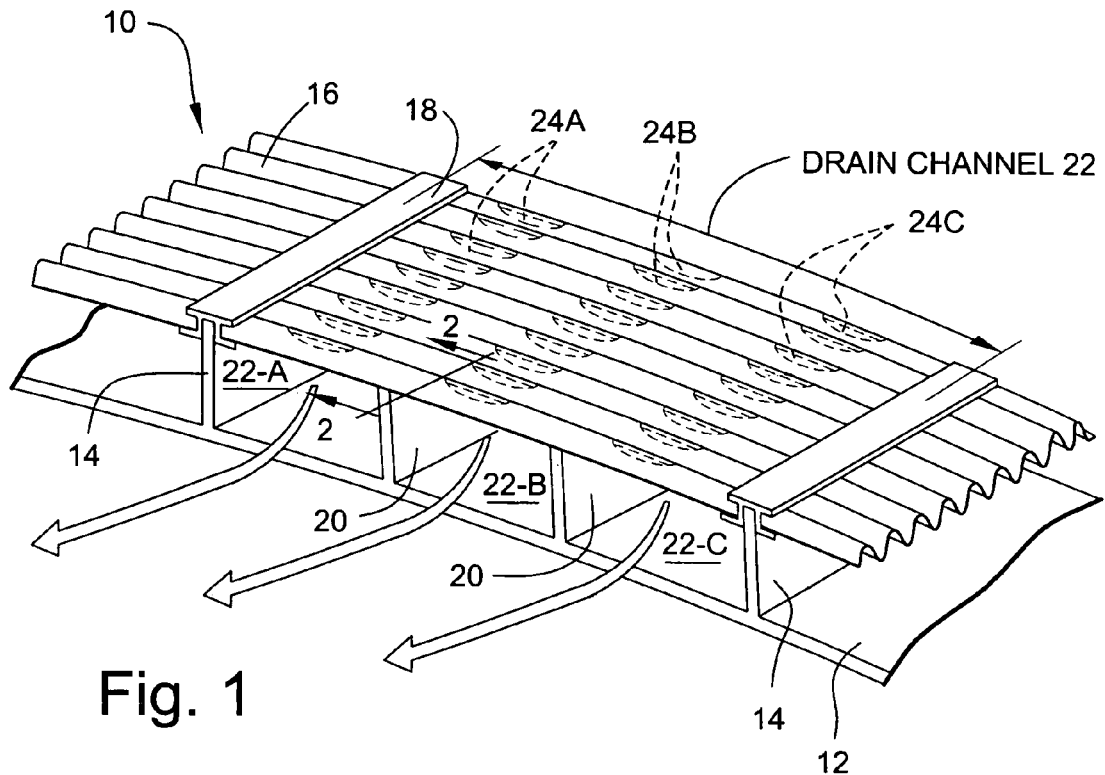

This application is based on, and claims domestic priority benefits under 35 USC §119(e) from, U.S. Provisional Patent Application Ser. No. 60/699,392 filed on Jul. 15, 2005, the entire content of which is expressly incorporated hereinto by reference.

FIELD OF THE INVENTION

The present invention relates generally to rotary drum filters. More specifically, the invention relates to an improved deck design for corrugated deck type rotary drum filters.

BACKGROUND AND SUMMARY OF THE INVENTION

Rotary drum filters are used in the pulp and paper industry to filter liquid out of pulp. The filters include a cylindrically shaped drum that is typically constructed of metallic and/or fiberglass materials. In operation, the drum is partially submerged in a vat containing a paper pulp stock. The outer surface of the drum is wrapped with a metal or plastic mesh known as a face wire which acts as a filtering medium that passes liquid as the drum is rotated. Pulp is retained on, and subsequently removed from, the outer surface of the drum.

The drum includes a cylindrical shell that is supported on the inside by flyrings and is closed at each end by end supports. Longitudinal grids are installed perpendicular to the outside surface or deck of the shell in a predetermined spaced relationship. The longitudinal divider grids or rib elements extend along the entire length of the deck and define drain compartments that empty into vacuum shut off sections, referred to as buckets or ports, located at the periphery of the deck.

In some filters, referred to as "open channel filters", the longitudinal grids are covered with a backing wire that forms the outer surface of the drum. This backing wire acts as the support for the face wire. Liquid can pass through the spaces provided between the backing wire while pulp is retained on the surface of the wire. In other filters, referred to as "corrugated deck filters", an example of which is disclosed in U.S. Pat. No. 3,837,499 (the entire content of which is expressly incorporated hereinto by reference), the longitudinal grids are covered with a corrugated material that forms the outer surface of the drum. The corrugated material includes drain slits to allow passage of filtrate from the surface of the drum to the drain compartments located beneath the deck and defined by the longitudinal grids. The deck design of the '499 patent has one drain slit per port, but three or more drainage compartments beneath the deck. Openings in the longitudinal grids within the port, known as intermediate grids, have openings to allow filtrate to be distributed to the other compartments.

Another drum structure for a rotary drum filter is provided in U.S. Pat. No. 5,308,488 (the entire content of which is expressly incorporated hereinto by reference) and includes longitudinal grids which are also covered with a corrugated material that forms the outer surface of the drum. As in the '499 patent, the corrugated material includes drain slits to allow passage of filtrate from the surface of the drum to the drain compartments located beneath the deck and defined by the longitudinal grids. The deck design of the '488 patent, however, has multiple drain slits per port, with each drain slit corresponding to a single drain channel. Additionally, each drain channel has one distinct deck panel section.

While such prior drum structures are satisfactory for their intended purposes, some improvements are still desired. For example, it would especially be desirable if the improved filtering efficiencies of the deck structure according to the U.S. '488 patent could be improved by removal of the deck fastening hardware on the drum surface and/or providing such improved structure with the lower cost manufacturing and installation features of the deck structure according to the U.S. '499 patent. It is towards providing such improvements that the present invention is directed.

Broadly, the present invention is embodied in a drum structure for corrugated type rotary filters having relatively high filtering efficiency and relatively low manufacturing and/or installation costs. More specifically, according to the present invention, a corrugated deck section is rigidly connected to a rotary drum structure by means of solid divider grids which establish a drain channel. The drain channel is subdivided into respective compartments by means of intermediate solid grids which are unconnected to the corrugated deck, but provide subjacent radial support thereto. Plug dams are provided in the corrugation spaces between the upper edge of the intermediate grids and the lower corrugated deck surface so as to prevent substantially filtrate flow between individual compartments. Drainage slits are provided in the corrugated deck in alignment with each of the compartments. Filtrate may thus flow through the drainage slits and into a respective one of the compartments where it can then subsequently be drained transversely and longitudinally into a respective port associated with the drum filter.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
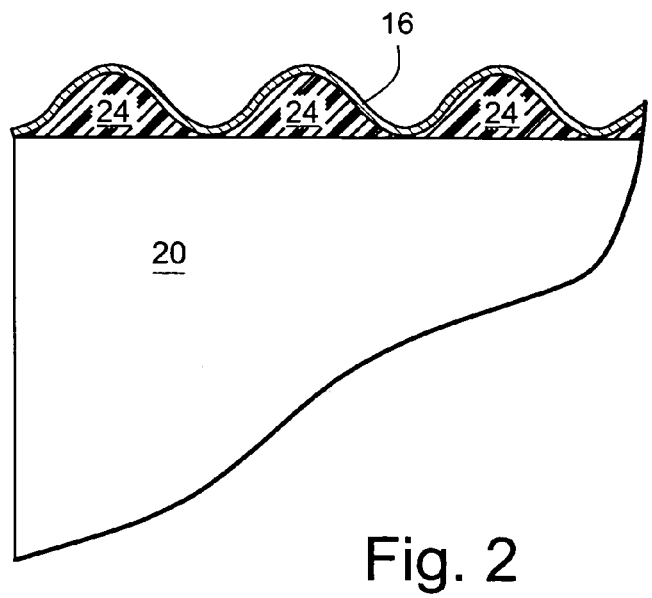

Reference will hereinafter be made to the accompanying drawings, wherein like reference numerals throughout the various FIGURES denote like structural elements, and wherein;

FIG. 1 illustrates in perspective a partial section of a deck structure in a corrugated type rotary drum filter according to the present invention; and FIG. 2 is an enlarged partial cross-sectional view of the deck structure shown in FIG. 1 as taken along line 2-2 therein.

DETAILED DESCRIPTION OF THE INVENTION

The filters with which the deck structure of the present invention is especially usefully employed are generally referred to as end-draining and center-draining rotary drum filters. It will be understood, however, that the invention is not limited to this particular type of rotary filter, but is applicable to all types of rotary drum filters, including center valve and circumferential valve filters, that utilize a corrugated deck structure.

Accompanying FIG. 1 illustrates a drum structure portion 10 of a corrugated deck rotary drum filter in accordance with the present invention. As can be seen, the drum structure generally includes an annular, rotatably driven drum 12 having circumferentially spaced-apart non-apertured (solid) divider grids 14 connected rigidly to the corrugated deck 16 by means of mounting clips 18. The drum 12 also includes a plurality of non-apertured (solid) intermediate grids 20 circumferentially spaced apart along the surface of the drum 12 between adjacent ones of the divider grids 14.

The intermediate grids 20 are provided between two adjacent longitudinal divider grids 14 in order to divide the drain channel 22 defined by the adjacent longitudinal divider grids 14 into compartments 22A, 22B and 22C. The corrugated deck 16 is provided with drainage slits 24A, 24B and 24C aligned with each of the compartments 22A, 22B and 22C, respectively. In this regard, each lower undulation of the corrugated deck 16 is provided with a drainage slit 24A, 24B or 24C with each such slit being in alignment with a respective one of the compartments 22A, 22B and 22C. Thus, filtrate is allowed to through the drainage slits 24A, 24B and 24C and into a respective one of the compartments 22A, 22B and 22C where it can then subsequently be drained transversely and longitudinally into a respective port (not shown) associated with each of the individual compartments 22A, 22B and 22C of the drain channel 22.

The lower ends of each of the divider and intermediate grids 14 and 20, respectively, are rigidly affixed to and thus carried by the drum 12 and extend generally longitudinally relative to the rotational axis of the drum 12. The corrugated deck 16 is thus also rigidly affixed to and carried by the drum 12 by virtue of its structural connection to the upper ends of the divider grids 14 by means of the mounting clips 18. The upper ends of the intermediate grids 20, however, are structurally unconnected to the corrugated deck 16. Instead, as can perhaps be better seen in FIG. 2, the corrugated deck 16 is structurally supported by the subjacent intermediate grids 20. Due to the corrugations of the deck 16, the contact between the deck 16 and the intermediate grids 20 does not provide a fluid-tight seal. However, according to the present invention, a plug dam 24 formed of a suitable sealing material is provided so as to fill the corrugation spaces on the underside of the deck panel 16 between adjacent contact areas with the upper edge of the intermediate grid 20 to thereby substantially prevent transverse filtrate flow between compartments 22A, 22B and 22C. Thus, filter efficiency is maintained since transverse flow between such compartments 22A, 22B and 22C has substantially been prevented by means of the solid (non-apertured) intermediate grids 20 and the plug dams 24.

It will of course be understood that while the plug dams 24 are depicted as being formed of a plastic or elastomeric type of material (e.g., a sealing caulk), such a depiction represents a currently preferred embodiment of the invention. Thus, other suitable liquid-impermeable materials may also be employed for the purpose of forming the plug dam 24. For example, a liquid metal may be employed to fill the corrugation spaces so that upon solidification it forms the plug dam 24. Furthermore, the intermediate grids 20 could unitarily include plug dams which are formed by means of an undulated top edge thereof conformably mating with the undulations of the corrugated deck 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Drum structure for corrugated type rotary filters comprising:
    a rotary drum support structure;
    a corrugated deck section having an upper surface for receiving a liquid flow of material to be filtered;
    a plurality of circumferentially separated solid non-apertured divider grids for rigidly connecting the corrugated deck section in spaced relationship to the rotary drum support structure and to thereby define therebetween a drain channel;
    a plurality of intermediate solid non-apertured grids positioned within the drain channel at circumferentially spaced apart locations such that at least one of the intermediate grids is positioned between each adjacent pair of the divider grids so as to subdivide the drain channel into respective compartments, the intermediate grids being structurally unconnected to the corrugated deck along an upper edge thereof but providing subjacent radial support thereto;
    drainage slits provided in the corrugated deck each in alignment with a respective one of the compartments; and
    plug dams provided in corrugation spaces between the upper edge of the intermediate grids and a lower surface of the corrugated deck so as to prevent substantially filtrate flow between individual ones of the compartments, whereby filtrate flows through the drainage slits and into a respective one of the compartments where it can then subsequently be drained transversely and longitudinally relative to the drum filter.

2. Drum structure as in claim 1, wherein the plug dams comprise a liquid-impermeable material which fills the corrugation spaces between the upper edge of the intermediate grids and the loser surface of the corrugated deck.

3. Drum structure as in claim 2, wherein the liquid-impermeable material comprises a plastic or elastomeric material.

4. Drum structure as in claim 3, wherein the plastic or elastomeric material is a sealing caulk.

5. Drum structure as in claim 2, wherein the liquid-impermeable material comprises metal.

6. Drum structure as in claim 1, wherein lower edges of the dividers and intermediate grids are rigidly connected to the rotary drum support structure.

7. Drum structure as in claim 1, wherein each lower undulation of the corrugated deck includes a drainage slit with each one of the slits being in alignment with a respective one of the compartments.

8. Drum structure as in claim 1, further comprising mounting clips for rigidly connecting the corrugated deck to the divider grids.

9. Drum structure as in claim 1, comprising multiple ones of the intermediate grids positioned between a respective pair of the divider grids.

10. A method of filtering a liquid material comprising the steps of:
    introducing a liquid material to be filtered onto an upper surface of a drum structure as in claim 1;
    rotating the drum structure to cause filtrate to flow through the drainage slits provided in the corrugated deck and into respective ones of the compartments; and
    draining the filtrate in the compartments transversely and longitudinally relative to the drum filter.

11. A method of making a drum structure for a corrugated type rotary drum filter, comprising;
  (i) providing a rotary drum support structure having a plurality of circumferentially separated solid non-apertured divider grids defining respective drain channels between adjacent pairs thereof, and a plurality of intermediate solid non-apertured grids positioned within the drain channels at circumferentially spaced-apart locations relative to one another such that at least one intermediate grid is positioned between an adjacent pair of the divider grids so as to subdivide the drain channel into respective chambers;
  (ii) positioning a corrugated deck section having an upper surface for receiving a liquid flow of material to be filtered over the divider and intermediate grids so that the corrugated deck section is rigidly connected to an upper edge of the divider grids but structurally unconnected to an upper edge of the intermediate grids;
  (iii) providing drainage slits in the corrugated deck so that each one of the drainage slits is in alignment with a respective one of the compartments; and
  (iv) installing plug dams in corrugation spaces between the upper edge of the intermediate grids and a lower surface of the corrugated deck so as to prevent substantially filtrate flow between individual ones of the compartments.

12. Method as in claim 11, wherein step (iv) comprises providing the plug dams by filling the corrugation spaces between the upper edge of the intermediate grids and the loser surface of the corrugated deck with a liquid-impermeable material.

13. Method as in claim 12, wherein the liquid-impermeable material comprises a plastic or elastomeric material.

14. Method as in claim 13, wherein the plastic or elastomeric material is a sealing caulk.

15. Method as in claim 12, wherein the liquid-impermeable material comprises metal.

16. Method as in claim 11, wherein step (ii) is practiced by rigidly connecting the lower edges of the divider grids and intermediate grids to the rotary drum support structure.

17. Method as in claim 11, wherein step (iii) is practice by forming a drainage slit in each lower undulation of the corrugated deck with each one of the slits being in alignment with a respective one of the compartments.

18. Method as in claim 11, wherein step (ii) includes rigidly connecting the corrugated deck to the divider grids by means of mounting clips.

19. Method as in claim 11, wherein step (i) includes positioning multiple ones of the intermediate grids between a respective pair of the divider grids.

* * * * *